United States Patent
Uyama et al.

(10) Patent No.: US 10,920,629 B2
(45) Date of Patent: Feb. 16, 2021

(54) OIL TEMPERATURE SENSOR DIAGNOSTIC DEVICE

(71) Applicant: SUBARU CORPORATION, Tokyo (JP)

(72) Inventors: Yu Uyama, Tokyo (JP); Daiki Kita, Tokyo (JP); Takayuki Tsurumaki, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/227,395

(22) Filed: Dec. 20, 2018

(65) Prior Publication Data

US 2019/0301319 A1    Oct. 3, 2019

(30) Foreign Application Priority Data

Mar. 29, 2018 (JP) .................... 2018-064470

(51) Int. Cl.
*F01M 11/10* (2006.01)
*G01K 15/00* (2006.01)
*F02N 11/08* (2006.01)

(52) U.S. Cl.
CPC ......... *F01M 11/10* (2013.01); *F02N 11/0818* (2013.01); *G01K 15/007* (2013.01); *G01K 2205/00* (2013.01)

(58) Field of Classification Search
CPC .. F01M 11/10; F02N 11/0818; G01K 15/007; G01K 2205/00
See application file for complete search history.

(56) References Cited

U.S. PATENT DOCUMENTS

| 5,235,527 | A | * | 8/1993 | Ogawa | F02D 41/222 340/653 |
| 5,884,243 | A | * | 3/1999 | Taniguchi | G05B 23/0235 123/41.05 |
| 6,283,381 | B1 | | 9/2001 | Uchiyama | |

(Continued)

FOREIGN PATENT DOCUMENTS

| JP | 2000-130242 A | 5/2000 |
| JP | 2011-252450 A | 12/2011 |

OTHER PUBLICATIONS

Japanese Office Action, dated Nov. 29, 2019, in Japanese Application No. 2018-064470 and English Translation thereof.

*Primary Examiner* — Joseph J Dallo
*Assistant Examiner* — Kurt Philip Liethen
(74) *Attorney, Agent, or Firm* — McGinn IP Law Group, PLLC

(57) ABSTRACT

An oil temperature sensor diagnostic device is configured to detect an abnormality in an oil temperature sensor provided in a vehicle, the vehicle including the oil temperature sensor configured to detect an oil temperature of a lubricant of an engine, and an idle-stop controller configured to execute an idle-stop control. The oil temperature sensor diagnostic device includes: a diagnostic value setting module configured to set a diagnostic value that is increased according to an elapsed running time; and an abnormality determination module configured to determine an abnormality of the oil temperature sensor in a case in which a rise in the oil temperature computed on a basis of an output of the oil temperature sensor is small compared to an amount of increase in the diagnostic value.

17 Claims, 5 Drawing Sheets

(56) References Cited

U.S. PATENT DOCUMENTS

| | | | | |
|---|---|---|---|---|
| 2006/0217857 | A1* | 9/2006 | Yoshida | G01K 15/00 |
| | | | | 374/102 |
| 2008/0262673 | A1* | 10/2008 | Hamama | G01K 15/00 |
| | | | | 701/30.7 |
| 2014/0185647 | A1* | 7/2014 | Kinoshita | G01K 15/007 |
| | | | | 374/4 |
| 2016/0273975 | A1* | 9/2016 | Tano | G01K 15/007 |
| 2018/0348071 | A1* | 12/2018 | Guo | G01K 15/007 |

\* cited by examiner

OIL TEMPERATURE SENSOR DIAGNOSTIC DEVICE

CROSS-REFERENCE TO RELATED APPLICATIONS

The present application claims priority from Japanese Patent Application No. 2018-064470 filed on Mar. 29, 2018, the entire contents of which are hereby incorporated by reference.

BACKGROUND

1. Technical Field

The present invention relates to an oil temperature sensor diagnostic device that executes a performance diagnostic on an oil temperature sensor that detects the oil temperature of engine lubricant.

2. Related Art

Engines on-board vehicles such as automobiles are provided with various temperature sensors, such as a water temperature sensor that detects the temperature of cooling water, and an oil temperature sensor that detects the oil temperature of lubricant (engine oil). Since such temperature sensors ensure the accuracy and validity of various controls based on the detection values, there is demand to execute an on-board diagnostic at any time while the vehicle is in use to check whether there is an abnormality in the detection performance.

As a technology of the related art that relates to the diagnostics of temperature sensors on-board an engine for a vehicle, for instance, Japanese Unexamined Patent Application Publication No. 2000-130242 describes a diagnostic device for a water temperature sensor that produces output according to the temperature of a coolant, in which a time when a predetermined amount of time has elapsed since engine start or a time when a predetermined amount of engine heat is produced is set as a measurement time, and a malfunction is determined in the case in which the amount of change in the sensor output from the engine start to the measurement time is less than a predetermined value.

SUMMARY OF THE INVENTION

An aspect of the present invention provides an oil temperature sensor diagnostic device for a vehicle. The vehicle includes an engine, an oil temperature sensor configured to detect an oil temperature of a lubricant of the engine, and an idle-stop controller configured to execute an idle-stop control that stops the engine in a case in which a predetermined idle-stop condition is satisfied and also automatically restarts the engine in a case in which a predetermined restart condition is satisfied. The oil temperature sensor diagnostic device is mountable on the vehicle and configured to detect an abnormality in the oil temperature sensor. The device includes: a diagnostic value setting module configured to set a diagnostic value that is increased according to an elapsed running time after a cold start of the engine; and an abnormality determination module configured to determine an abnormality of the oil temperature sensor in a case in which a rise in the oil temperature computed on a basis of an output of the oil temperature sensor is small compared to an amount of increase in the diagnostic value. The idle-stop controller has a function of executing the idle-stop control before a determination is made by the abnormality determination module, and the diagnostic value setting module is configured to interrupt the increasing of the diagnostic value while the engine is stopped by the idle-stop control.

An aspect of the present invention provides an oil temperature sensor diagnostic device for a vehicle. The vehicle includes an engine, an oil temperature sensor configured to detect an oil temperature of a lubricant of the engine, and an idle-stop controller configured to execute an idle-stop control that stops the engine in a case in which a predetermined idle-stop condition is satisfied and also automatically restarts the engine in a case in which a predetermined restart condition is satisfied. The oil temperature sensor diagnostic device is mountable on the vehicle and configured to detect an abnormality in the oil temperature sensor. The device includes circuitry. The circuitry is configured to set a diagnostic value that is increased according to an elapsed running time after a cold start of the engine. The circuitry is configured to determine an abnormality of the oil temperature sensor in a case in which a rise in the oil temperature computed on a basis of an output of the oil temperature sensor is small compared to an amount of increase in the diagnostic value. The idle-stop controller has a function of executing the idle-stop control before a determination is made by the abnormality determination module, and the The circuitry is configured to interrupt the increasing of the diagnostic value while the engine is stopped by the idle-stop control.

DETAILED DESCRIPTION

Figure 1:
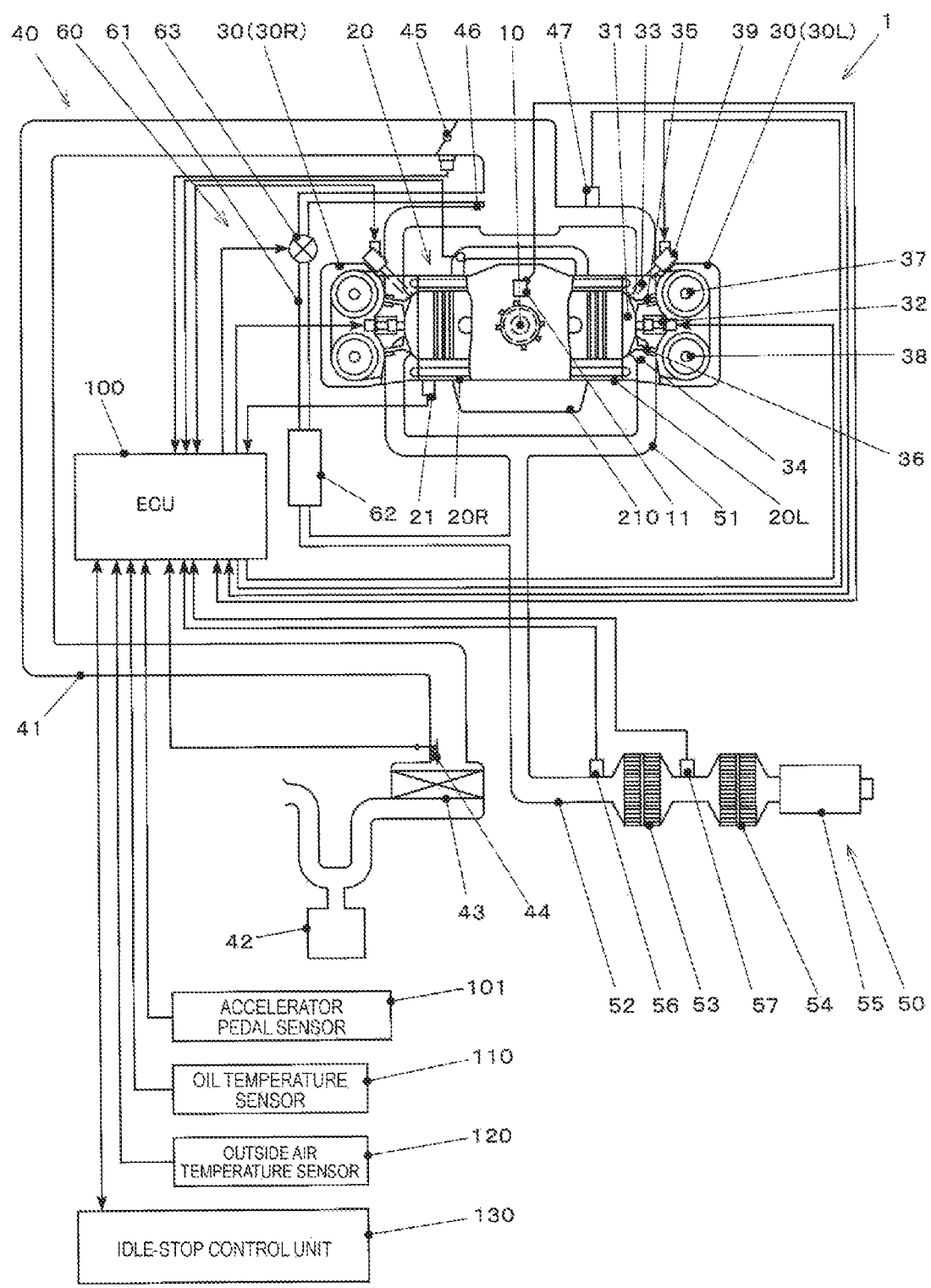
FIG. 1 is a diagram that schematically illustrates a configuration of an engine including an instance of an oil temperature sensor diagnostic device applying an example of the present invention.

Hereinafter, preferred examples of the present invention will be described in detail with reference to the appended drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout this specification and the appended drawings, structural elements that have substantially the same function and structure are denoted with the same reference numerals, and repeated description of these structural elements is omitted.

In an oil temperature sensor that detects the oil temperature of engine oil, it is possible to execute a performance diagnostic comparing the elapsed time since engine start to the amount of change in the oil temperature sensor output (the amount of rise in the detected oil temperature), in a manner basically similar to the water temperature sensor described above. On the other hand, in an engine for a vehicle, to moderate fuel consumption, idle-stop control is executed in which the engine is stopped when a predetermined idle-stop condition is satisfied, and after that, the engine is restarted automatically when a predetermined restart condition is satisfied. In the related art, idle-stop control is initiated after engine warm-up is finished (after the cooling water temperature becomes sufficiently high) in many cases, but in recent engines, to moderate fuel consumption further, there has been a tendency to expand the operating region in which the idle-stop control is executable to a region in which the cooling water temperature is of a lower temperature (for instance, approximately 40° C.). As a result, in some cases, the idle-stop control is executed and the engine is stopped while in the middle of adding up the elapsed time since engine start to execute the performance diagnostic of the oil temperature sensor.

If the engine is stopped by the idle-stop control while the lubricant temperature is rising, since heat generation inside the engine due to combustion ceases during this period, the rise in the lubricant temperature stagnates, and as a result, there is concern about impeding the performance diagnostic of the oil temperature sensor. In light of the issues described above, it is desirable to provide an oil temperature sensor diagnostic device capable of executing an appropriate diagnostic even in the case in which the engine is stopped by the idle-stop control during the diagnostic of the oil temperature sensor. The oil temperature sensor diagnostic device according to the example is provided in a horizontally-opposed four-cylinder gasoline direct-injection engine installed as a source of power for traction on-board a passenger vehicle or the like, for instance.

An example of an oil temperature sensor diagnostic device applying the present invention will be described.

FIG. 1 is a diagram that schematically illustrates a configuration of an engine including the oil temperature sensor diagnostic device according to the example. The engine 1 includes a crank shaft 10, a cylinder block 20 (20R, 20L), cylinder heads 30 (30R, 30L), an intake system 40, an exhaust system 50, an EGR device 60, an engine control unit (ECU) 100, and the like.

The crank shaft 10 is a rotating shaft that acts as the output shaft of the engine 1. A power transmission mechanism such as a transmission or the like not illustrated is coupled to one end of the crank shaft 10. On the crank shaft 10, crank pins disposed eccentrically from the rotating shaft are formed. Pistons are coupled to the crank pins via connecting rods not illustrated. The end of the crank shaft 10 is provided with a crank angle sensor 11 that detects the angular position of the crank shaft. The output of the crank angle sensor 11 is transmitted to the engine control unit 100. The engine control unit 100 computes the engine speed (the rotational speed of the crank shaft) on the basis of the output of the crank angle sensor 11.

The cylinder block 20 is dual-partitioned into a right-side cylinder block 20R and a left-side cylinder block 20L, such that the crank shaft 10 is interposed in the horizontal direction in the case of installing the engine vertically in the vehicle body. In the center of the cylinder block 20, a crank case is provided. The crank case is a space that houses the crank shaft 10. In the crank case, a main bearing that rotatably supports the journals of the crank shaft 10 is provided. Inside the right-side cylinder block 20R and the left-side cylinder block 20L disposed on the left and right sides with the crank case disposed in between, cylinders into which internally reciprocating pistons are inserted, for instance, two cylinders each (in the case of a four-cylinder engine) are formed.

The cylinder block 20 is provided with a knock sensor 21. The knock sensor 21 includes a piezoelectric element that produces an output voltage in response to the vibration of the cylinder block 20. The engine control unit 100 is able to detect the presence or absence of knocking on the basis of a characteristic output waveform of the knock sensor 21 when knocking occurs.

The cylinder heads 30 (right-side cylinder head 30R, left-side cylinder head 30L) are provided on each end (the left and right ends) on the opposite side from the crank shaft 10 of the cylinder block 20. The cylinder heads 30 are provided with a combustion chamber 31, a spark plug 32, an intake port 33, an exhaust port 34, an intake valve 35, an exhaust valve 36, an intake cam shaft 37, an exhaust cam shaft 38, an injector 39, and the like. The combustion chamber 31 is formed with the site opposing the piston crown of the cylinder heads 30 depressed in a pent-roof shape, for instance. The spark plug 32 produces a spark in response to an ignition signal from the engine control unit 100, and ignites the air-fuel mixture. The spark plug 32 is provided in the center of the combustion chamber 31.

The intake port 33 is a channel that introduces air for combustion (fresh air) into the combustion chamber 31. The exhaust port 34 is a channel that discharges burned gas (exhaust gas) from the combustion chamber 31. The intake valve 35 and the exhaust valve 36 open and close the intake port 33 and the exhaust port 34 at predetermined valve timings. Two of each of the intake valve 35 and the exhaust valve 36 are provided in each cylinder, for instance. The intake valve 35 and the exhaust valve 36 are opened and closed by the intake cam shaft 37 and the exhaust cam shaft 38 that rotate in synchronization at ½ the rotational rate of the crank shaft 10. A variable valve timing mechanism not illustrated that varies the valve-opening time and the valve-closing time of each valve by advancing or retarding the phase of each cam shaft is provided in the cam sprocket of the intake cam shaft 37 and the exhaust cam shaft 38. The injector 39 injects fuel into the combustion chamber 31 to form an air-fuel mixture in response to a valve-opening signal produced by the engine control unit 100. In the injector 39, a nozzle that injects fuel is provided exposed inside the cylinder from the region on the intake port 33 side on the inner face of the combustion chamber 31.

The intake system 40 introduces air to introduce into the intake port 33. The intake system 40 is provided with an intake duct 41, a chamber 42, an air cleaner 43, an air flow meter 44, a throttle valve 45, an intake manifold 46, an intake pressure sensor 47, and the like.

The intake duct 41 is a channel that introduces outside air into the intake port 33. The chamber 42 is a space provided in communication with the area near the inlet of the intake duct 41. The air cleaner 43 filters air to remove dust and the like. The air cleaner 43 is provided on the downstream side of the site where the intake duct 41 communicates with the chamber 42. The air flow meter 44 measures the flow rate of air passing through the intake duct 41. The air flow meter 44 is provided near the outlet of the air cleaner 43. The output of the air flow meter 44 is transmitted to the engine control unit 100.

The throttle valve 45 is a butterfly valve that adjusts the flow rate of air to control the output of the engine 1. The throttle valve 45 is provided near the connection with the intake manifold 46 in the intake duct 41. The opening and closing of the throttle valve 45 are driven by a motorized throttle actuator not illustrated in response to a target throttle valve position that the engine control unit 100 sets according to the torque demanded by the driver and the like. Also, the throttle valve 45 is provided with a throttle sensor that detects the valve position, and the output of the throttle sensor is transmitted to the engine control unit 100. The intake manifold 46 is a branch pipe that distributes air to the intake port 33 of each cylinder. The intake manifold 46 is provided on the downstream side of the throttle valve 45. The intake pressure sensor 47 detects the pressure of air (intake pressure) inside the intake manifold 46. The output of the intake pressure sensor 47 is transmitted to the engine control unit 100.

The exhaust system 50 externally exhausts exhaust gas discharged from the exhaust port 34. The exhaust system 50 includes an exhaust manifold 51, an exhaust pipe 52, a front catalyst 53, a rear catalyst 54, a silencer 55, an air-fuel ratio sensor 56, a rear O2 sensor 57, and the like.

The exhaust manifold 51 is a manifold that collects exhaust gas exiting the exhaust port 34 of each cylinder. The exhaust pipe 52 is a duct that externally discharges exhaust gas exiting the exhaust manifold 51. The front catalyst 53 and the rear catalyst 54 are provided at intermediate point along the exhaust pipe 52, and each is provided with a three-way catalyst that purifies the exhaust gas of HC, NOX, CO, and the like. The front catalyst 53 is provided adjacent to the outlet of the exhaust manifold 51, while the rear catalyst 54 is provided on the outlet side of the front catalyst. The silencer 55 reduces the acoustic energy of the exhaust gas. The silencer 55 is provided near the outlet of the exhaust pipe 52.

The air-fuel ratio sensor 56 is provided between the outlet of the exhaust manifold 51 and the inlet of the front catalyst 53. The rear O2 sensor 57 is provided between the outlet of the front catalyst 53 and the inlet of the rear catalyst 54. The air-fuel ratio sensor 56 and the rear O2 sensor 57 both detect the amount of oxygen present in the exhaust gas by producing an output voltage corresponding to the oxygen concentration in the exhaust gas. The air-fuel ratio sensor 56 is a linear output sensor capable of detecting the oxygen concentration over a broader range of air-fuel ratios than the rear O2 sensor 57. The outputs of the air-fuel ratio sensor 56 and the rear O2 sensor 57 are both transmitted to the engine control unit 100.

The EGR device 60 performs exhaust gas recirculation (EGR) that extracts a portion of the exhaust gas from the exhaust manifold 51 as EGR gas, and introduces the EGR gas into the intake manifold 46. The EGR device 60 is provided with an EGR channel 61, an EGR cooler 62, an EGR valve 63, and the like.

The EGR channel 61 is a duct that introduces exhaust gas (EGR gas) from the exhaust manifold 51 into the intake manifold 46. The EGR cooler 62 cools EGR gas flowing through the EGR channel 61 by heat exchange with the cooling water of the engine 1. The EGR cooler 62 is provided partway along the EGR channel 61. The EGR valve 63 is a metering valve that adjusts the flow rate of EGR gas passing through the EGR channel 61. The EGR valve 63 is provided on the downstream side of the EGR cooler 62 in the EGR channel 61. The EGR valve 63 includes a valving element driven to open and close by an electric actuator such as a solenoid, in which the valve position is controlled using a valve position map set by the engine control unit 100 on the basis of a target EGR ratio (EGR gas flow rate/intake flow rate).

The engine control unit 100 centrally controls the engine 1 and auxiliary components. The engine control unit 100 is provided with an information processing component such as a CPU, memory components such as RAM and ROM, an input/output interface, a bus coupling these components, and the like. Additionally, the engine control unit 100 is provided with an accelerator pedal sensor 101 that detects the depression of an accelerator pedal not illustrated by the driver. The engine control unit 100 is provided with a function of setting the driver-demanded torque on the basis of the output of the accelerator pedal sensor 101 and the like. The engine control unit 100 controls the valve position of the throttle valve, the supercharging pressure, and fuel injection rate, the fuel injection timing, the ignition timing, the valve timing, and the like such that the torque actually produced by the engine 1 approaches the set driver-demanded torque. In one example, the engine control unit 100 may serve as a "diagnostic value setting module" and an "abnormality determination module" in the oil temperature sensor diagnostic device according to the example. These functions will be described in detail later.

Additionally, an oil temperature sensor 110, an outside air temperature sensor 120, an idle-stop control unit 130, and the like are coupled to the engine control unit 100. The oil temperature sensor 110 is a temperature sensor that detects the temperature of the lubricant (oil) of the engine 1. The outside air temperature sensor 120 is a temperature sensor that detects the temperature of air outside the vehicle (the ambient temperature around the vehicle).

The idle-stop control unit 130 executes an idle-stop control that automatically stops the engine 1 in a case in which the operating states of the engine 1 and the vehicle satisfy a predetermined idle-stop condition. The idle-stop condition may be, for instance, that the vehicle is determined to be stopped, that the driver-demanded torque is substantially zero (an accelerator off state), that the cooling water temperature of the engine 1 is a predetermined value (for instance, 40° C.) or greater, that the master cylinder hydraulic pressure of the brakes is a predetermined value or greater, that the steering angle is a predetermined value or less, that the state of charge (SOC) of a battery for restarting is a predetermined value or greater, that an air-conditioning demand is a predetermined value or less, or the like. In the case in which all of these conditions are satisfied, the engine control unit 100 stop fuel injection and ignition in the engine 1, and stops the engine 1.

At this point, in the case of performing a cold start of the engine 1 (starting cold after a soak state) from a state in which the outside air temperature is approximately 20° C., for instance, the temperatures of the cooling water and the oil when starting are both substantially equal to the outside air temperature. After that, in the early warm-up phase (immediately after starting), the cooling water rises in temperature earlier than the oil. In this example, as described later, the performance diagnostic of the oil temperature sensor 110 is executed until the oil temperature reaches 45° C., but the cooling water temperature reaches 40° C. before the oil temperature reaches 45° C., and a state in which the idle-stop control is executable is reached. In other words, in this example, there is a possibility that the idle-stop control may intervene during the diagnostic of the oil temperature sensor 110.

Also, in the case in which a predetermined restart condition is satisfied while executing the idle-stop control, the idle-stop control unit 130 executes a restart control that automatically restarts the engine 1. The restart condition may be, for instance, that at least one of the idle-stop conditions is no longer satisfied. In the case in which the restart condition is satisfied, the engine control unit 100 causes the crank shaft to rotate (cranking) by a starter motor not illustrated while also resuming fuel injection and ignition, and restarts the engine 1.

Figure 2:
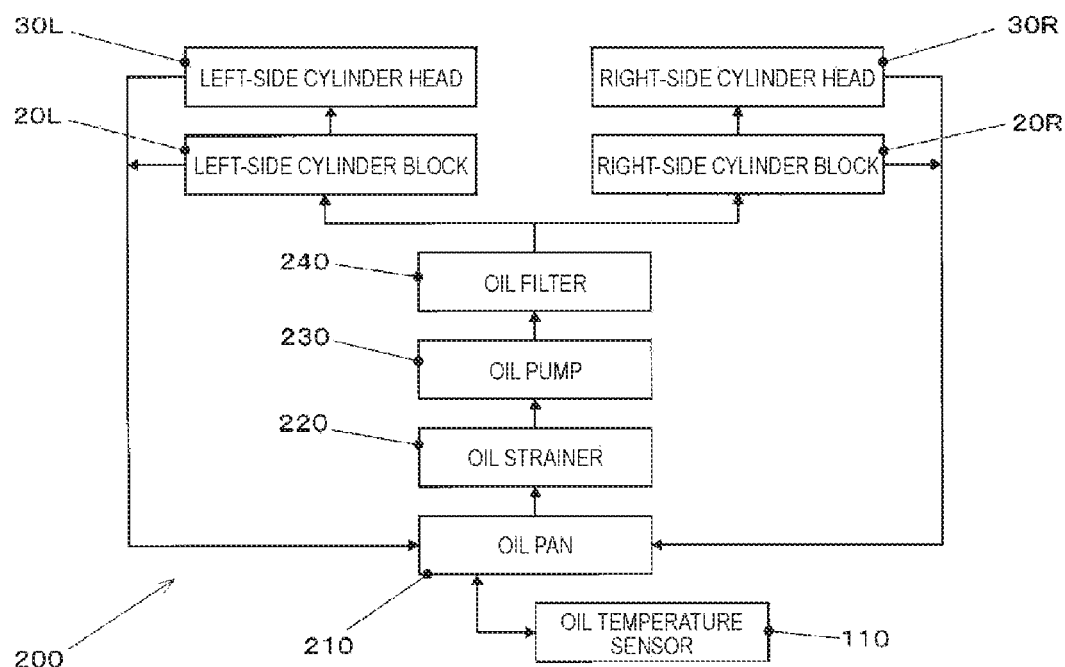
FIG. 2 is a block diagram that schematically illustrates a configuration of a lubrication device of the engine of FIG. 1.

The engine 1 is provided with a lubrication device described below. FIG. 2 is a block diagram that schematically illustrates a configuration of a lubrication device of the engine of FIG. 1. As illustrated in FIG. 2, the lubrication device 200 includes an oil pan 210, an oil strainer 220, an oil pump 230, an oil filter 240, and the like.

The oil pan 210 is a tray-shaped member provided underneath the cylinder block 20. The oil pan 210 retains oil, which is the lubricant of the engine 1 and also the hydraulic oil of the variable valve timing mechanism and a hydraulic lash adjuster. The oil temperature sensor 110 that detects the temperature of the oil (oil temperature) is provided in the oil pan 210.

The oil strainer 220 is an oil intake coupled to the suction inlet of the oil pump 230. The end on the inlet side of the oil strainer 220 is disposed inside the oil pan 210. The oil strainer 220 has a function of removing relatively large foreign particles in the oil with a screen such as a wire net, for instance.

The oil pump 230 pressurizes and transports (pumps) oil taken in through the oil strainer 220 to each component of the engine 1. For instance, the oil pump 230 is a trochoid rotor design driven by the crank shaft 10 of the engine 1. The oil pump 230 includes an inner rotor and an outer rotor combined inside a pump body. The inner rotor is configured to rotate with respect to the outer rotor in conjunction with the rotation of the crank shaft 10. Also, the oil pump 230 is provided with a relief valve not illustrated that prevents excessive oil pressure on the discharge side.

The oil filter 240 is for instance a full flow cartridge design that uses a paper element to filter oil discharged by the oil pump 230. Oil exiting from the oil filter 240 is pumped to an oil gallery not illustrated that is formed inside each of the right-side cylinder block 20R and the left-side cylinder block 20L.

Some of the oil supplied to the right-side cylinder block 20R and the left-side cylinder block 20L is supplied to journal bearings and connecting rod bearings not illustrated, and lubricates these bearings. After that, the oil leaks out from the sites being lubricated, and then returns the oil pan 210 by free fall. Also, some of the oil splashes to lubricate the small ends of the connecting rods and the cylinder inner walls.

Another part of the oil supplied to the right-side cylinder block 20R is also supplied to the right-side cylinder head 30R, and after lubricating the valve train and the like, returns to the oil pan 210. Another part of the oil supplied to the left-side cylinder block 20L is also supplied to the left-side cylinder head 30L, and after lubricating the valve train and the like, returns to the oil pan 210.

Figure 3:
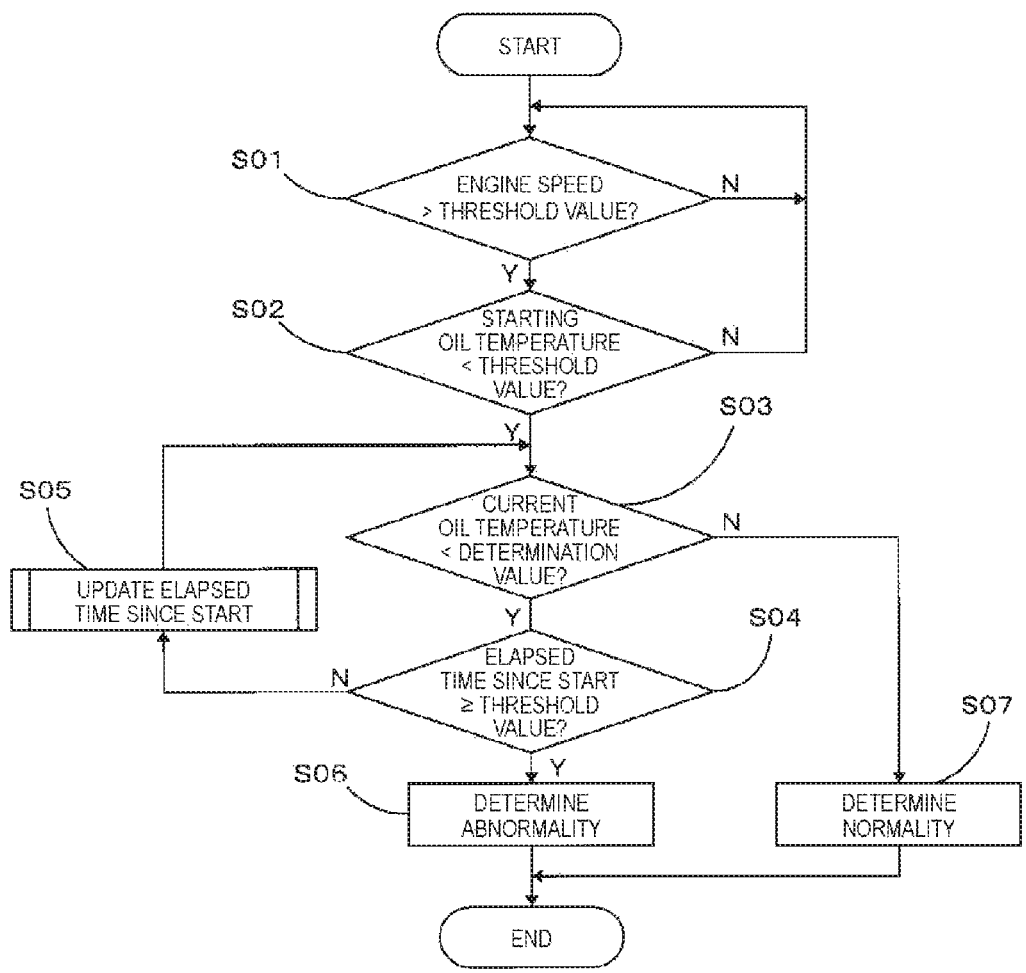
FIG. 3 is a flowchart that illustrates operations of the oil temperature sensor diagnostic device according to the example.

Hereinafter, operations of the oil temperature sensor diagnostic device according to the example will be described. FIG. 3 is a flowchart that illustrates operations of the oil temperature sensor diagnostic device according to the example. Hereinafter, each step will be described in order.

<Step S01: Engine Speed Assessment>

The engine control unit 100 detects the engine speed (the rotational speed of the crank shaft 10) on the basis of the output of the crank angle sensor 11. In the case in which the engine speed exceeds a threshold value set in consideration of the engine being in a normal operating state, the flow proceeds to S02, otherwise step S01 is repeated. Herein, as the threshold value, a lower-limit speed when idling (approximately 350 rpm, for instance) may be used, for instance.

<Step S02: Starting Oil Temperature Assessment>

The engine control unit 100 compares an oil temperature when the engine starts computed on the basis of the output of the oil temperature sensor 110 to a preset threshold value. For instance, in consideration of the oil temperature during a cold start, the threshold value is set approximately to be substantially the same as or slightly higher than the outside air temperature. In the case in which the starting oil temperature is less than the threshold value, the flow proceeds to step S03, otherwise the flow returns to step S01 and the process thereafter is repeated.

<Step S03: Oil Temperature Determination Value Assessment>

The engine control unit 100 compares a current oil temperature computed on the basis of the output of the oil temperature sensor 110 (the oil temperature detected by the oil temperature sensor 110) to a preset determination value. The determination value is set in consideration of the oil temperature when the warm-up of the engine 1 is substantially over, for instance, and is set to approximately 45° C., for instance. In the case in which the current oil temperature is less than the determination value, the flow proceeds to step S04, otherwise the flow proceeds to step S07.

<Step S04: Elapsed Time Since Engine Start Assessment>

The engine control unit 100 compares an elapsed time since engine start, which is a parameter correlated to the elapsed time after the start of the engine 1 (as described later, this time is not the actually elapsed time), and which functions as a diagnostic value in the abnormality determination, to a threshold value preset in consideration of the time taken to warm up the engine 1 (the time in which the oil temperature normally reaches the determination value). In the case in which the elapsed time since engine start is the threshold value or greater, the flow proceeds to step S06, otherwise the flow proceeds to step S05.

<Step S05: Update of Elapsed Time Since Engine Start>

The engine control unit 100 updates the elapsed time since engine start. The process of updating the elapsed time since engine start will be described in detail later. After that, the flow returns to step S03, and the process thereafter is repeated.

<Step S06: Determination of Abnormality>

The engine control unit 100 determines that there is an abnormality, which indicates that the oil temperature sensor 110 is malfunctioning (that is, an expected change in the output corresponding to a change in the oil temperature is not obtained). In response to the determination of an abnormality, a user such as the driver is informed that a malfunction has occurred with a warning light or the like not illustrated. Also, each control using the oil temperature detected by the oil temperature sensor 110 changes over to a failsafe control presupposing that the oil temperature is not acquirable. After that, the series of processes ends.

<Step S07: Determination of Normality>

The engine control unit 100 determines that there is normality, which indicates that the oil temperature sensor 110 is operating normally. After that, the series of processes ends.

Figure 4:
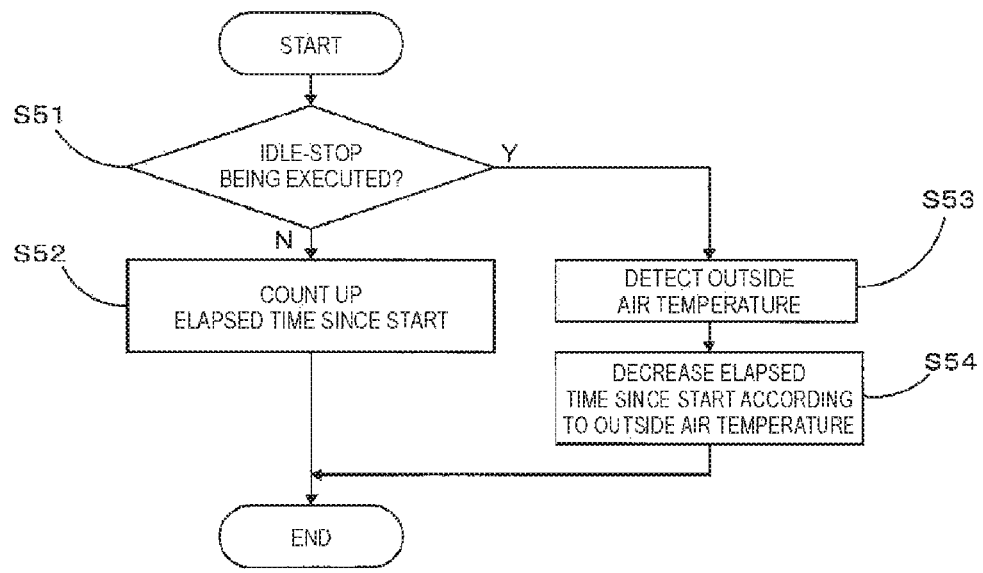
FIG. 4 is a flowchart that illustrates a process of updating the elapsed time since engine start in the oil temperature sensor diagnostic device according to the example.

Hereinafter, the process of updating the elapsed time since engine start described above (see step S05) will be described. FIG. 4 is a flowchart that illustrates a process of updating the elapsed time since engine start in the oil temperature sensor diagnostic device according to the example. Hereinafter, each step will be described in order.

<Step S51: Idle-Stop Execution Assessment>

The engine control unit 100 determines whether the engine 1 has been stopped by the idle-stop control. In the case in which the engine 1 is stopped, the flow proceeds to step S53, whereas in the case in which the engine 1 is running, the flow proceeds to step S52.

<Step S52: Count Up of Elapsed Time Since Engine Start>

The engine control unit 100 increases (counts up) the elapsed time since engine start according to the actual elapsed time. After that, the series of processes ends (proceeds to step S03 of FIG. 3).

<Step S53: Outside Air Temperature Detection>

The engine control unit 100 acquires information related to the outside air temperature on the basis of the output of the outside air temperature sensor 120. After that, the flow proceeds to step S54.

<Step S54: Subtraction of Elapsed Time Since Engine Start>

The engine control unit 100 computes a subtraction amount to subtract from the elapsed time since engine start. The subtraction amount of the elapsed time since engine start is set to be larger with increased stopped time of the engine 1, and for instance, increases proportionally with the stopped time. In addition, the subtraction amount of the elapsed time since engine start is set to become larger as the outside air temperature falls (to become smaller as the outside air temperature rises), in consideration of how the amount of cooling of the oil while the engine is stopped increases as the outside air temperature becomes lower. Such a subtraction amount of the elapsed time since engine start may be computed when restarting the engine 1, for instance. After computing the subtraction amount of the elapsed time since engine start, the engine control unit 100 subtracts the subtraction amount from the most recent elapsed time since engine start. After that, the series of processes ends (proceeds to step S03 of FIG. 3).

Figure 5:
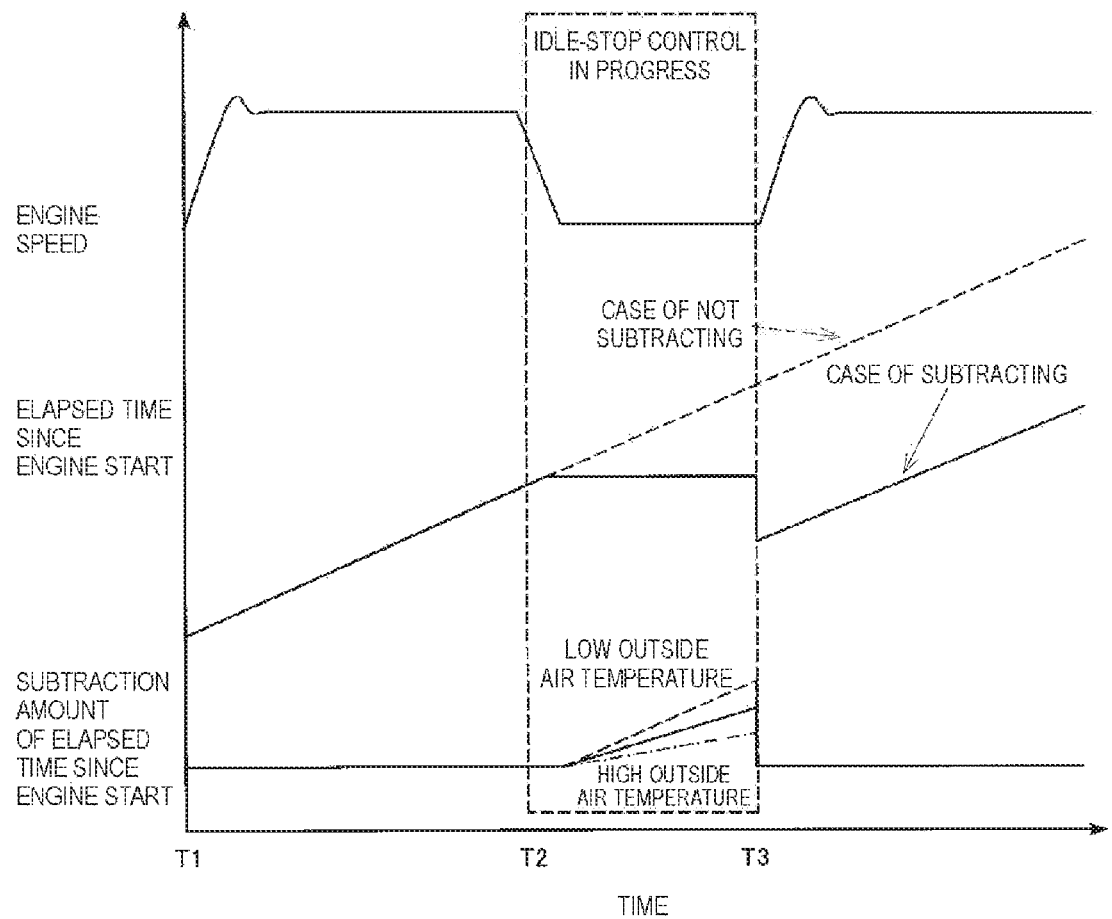
FIG. 5 is a diagram that illustrates one example of changes in the engine speed, the elapsed time since engine start, and the amount subtracted from the elapsed time since engine start during an oil temperature sensor diagnostic in the oil temperature sensor diagnostic device according to the example.

FIG. 5 is a diagram that illustrates one example of changes in the engine speed, the elapsed time since engine start, and the amount subtracted from the elapsed time since engine start during an oil temperature sensor diagnostic in the oil temperature sensor diagnostic device according to the example. The vertical axis indicates the engine speed, the elapsed time since engine start, and the amount subtracted from the elapsed time since engine start, while the horizontal axis indicates time. At a time T1, the engine 1 is cold-started. After that, the elapsed time since engine start increases proportionally with the elapse of the running time. At a time T2, the idle-stop control is executed, and the engine 1 is stopped temporarily. At this time, increase in the elapsed time since engine start is interrupted.

At a time T3, the restart control is executed and the engine 1 is restarted. At this time, the elapsed time since engine start is decreased by a subtraction amount set according to the stopped time of the engine 1 due to the idle-stop control. In FIG. 5, the normal subtraction amount is indicated by a solid line, the subtraction amount for a low outside air temperature compared to normal is indicated by a dashed line, and the subtraction amount for a high outside air temperature compared to normal is indicated by a chain line. As illustrated in FIG. 5, the subtraction amount increases substantially proportionally with the engine stopped time due to idle-stop, and is also set larger as the outside air temperature falls (set smaller as the outside air temperature rises). The elapsed time since engine start, after decreasing due to the subtraction of the computed subtraction amount, again increases according to the running time of the engine 1.

In FIG. 5, a dashed line is used to indicate the elapsed time since engine start in the case of not executing a subtraction associated with the idle-stop control described above. In the case of not executing a subtraction associated with the idle-stop control, the elapsed time since engine start simply continues to increase even during periods in which the engine 1 is stopped, there is no generation of heat due to combustion, and heat input into the oil is substantially discontinued, and therefore in the case of executing a performance diagnostic of the oil temperature sensor on the basis of the elapsed time since engine start, there is concern that the diagnostic may not be executed appropriately. For instance, there is concern that an incorrect diagnostic may determine an abnormality to exist even though the oil temperature sensor 110 is operating correctly. In contrast, in the example, interruptions in heat input into the oil while the engine is stopped and the influence of the cooling of the oil pan 210 by outside air are taken into account, and the diagnostic of the oil temperature sensor 110 may be executed while appropriately reflecting the physical phenomenon of the oil temperature falling according to the engine stopped time during idle-stop.

As described above, according to the example, the following effects may be obtained.

(1) When the engine is stopped by the idle-stop control, by stopping the increase of the elapsed time since engine start (the diagnostic value in the example), the oil temperature behavior while the engine is stopped and there is no generation of heat due to combustion inside the engine 1 may be reflected appropriately in the elapsed time since engine start, and the diagnostic accuracy for the oil temperature sensor 110 may be improved.

(2) When the engine is stopped by the idle-stop control, by decreasing the elapsed time since engine start by a subtraction amount corresponding to the stopped time, the phenomenon by which oil is cooled by the transfer of heat from the oil pan 210 and the like to the outside air while the engine is stopped may be reflected in the elapsed time since engine start, the elapsed time since engine start may be set more appropriately, and the diagnostic accuracy for the oil temperature sensor 110 may be improved.

(3) By varying the subtraction amount to subtract from the elapsed time since engine start according to the outside air temperature, it becomes possible to make the diagnostic value more appropriately reflect drops in the oil temperature while the engine is stopped, and the diagnostic accuracy for the oil temperature sensor 110 may be improved further.

MODIFICATIONS

The present invention is not limited to the example described above, and various modifications and alterations are possible within the technical range of the present invention.

(1) The configuration of the oil temperature sensor diagnostic device and the engine is not limited to the example described above and may be modified as appropriate. For instance, in the example, the engine is a horizontally-opposed direct-injection gasoline engine, but the present invention is also applicable to other types of internal combustion engines. For instance, the cylinder layout, the number of cylinders, the method of fuel injection, the presence or absence of a supercharger, and the like are not particularly limited. Also, the present invention is not limited to a gasoline engine, and is also applicable to an engine (such as a diesel engine) that uses a fuel other than gasoline. Also, in the example, the oil temperature sensor is provided in the oil pan, but the installation location of the oil temperature sensor is not particularly limited, and may be provided in any location in the lubricant path.

(2) In the example, the subtraction amount of the elapsed time since engine start is varied on the basis of the outside air temperature, but the subtraction amount may also be varied on the basis of a parameter other than the outside air temperature that is correlated with the outside air temperature. For instance, the subtraction amount may be varied according to the temperature of fresh air (intake temperature) or the like in the engine 1. Also, instead of acquiring the outside air temperature in the vehicle with an outside air temperature sensor, a communication device may be used to acquire information related to the outside air temperature from an external source using weather information or the like, for instance.

(3) In the example, a diagnostic is executed on the basis of the elapsed time since engine start until a set oil temperature is reached, but instead, a diagnostic may be executed on the basis of the rise in the oil temperature during a set elapsed time since engine start.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. An oil temperature sensor diagnostic device for a vehicle, the vehicle comprising
an engine,
an oil temperature sensor configured to detect an oil temperature of a lubricant of the engine, and
an idle-stop controller configured to execute an idle-stop control that stops the engine in a case in which a predetermined idle-stop condition is satisfied and also automatically restarts the engine in a case in which a predetermined restart condition is satisfied,
the oil temperature sensor diagnostic device being mountable on the vehicle and configured to detect an abnormality in the oil temperature sensor, the oil temperature sensor diagnostic device comprising:
a memory storing instructions;
a processor executing the instructions and configured to:
set a diagnostic value that is increased according to an elapsed running time after a cold start of the engine; and
determine an abnormality of the oil temperature sensor when the oil temperature computed on a basis of an output of the oil temperature sensor is less than a preset determination value, and the diagnostic value reaches a preset threshold value, wherein
the idle-stop controller executes the idle-stop control before a determination is made by the processor, and
the processor is configured to interrupt the increasing of the diagnostic value while the engine is stopped by the idle-stop control,
wherein when the engine is stopped by the idle-stop control, the processor decreases the diagnostic value by a subtraction amount that increases according to a stopped time; and
an outside air temperature detector configured to detect a parameter correlated with an outside air temperature of the vehicle, wherein
the processor increases the subtraction amount according to a drop in the outside air temperature.

2. An oil temperature sensor diagnostic device for a vehicle, the vehicle comprising
an engine,
an oil temperature sensor configured to detect an oil temperature of a lubricant of the engine, and
an idle-stop controller configured to execute an idle-stop control that stops the engine in a case in which a predetermined idle-stop condition is satisfied and also automatically restarts the engine in a case in which a predetermined restart condition is satisfied,
the oil temperature sensor diagnostic device being mountable on the vehicle and configured to detect an abnormality in the oil temperature sensor, the device comprising:
circuitry configured to
set a diagnostic value that is increased according to an elapsed running time after a cold start of the engine, and
determine an abnormality of the oil temperature sensor when the oil temperature computed on a basis of an output of the oil temperature sensor is less than a preset determination value, and the diagnostic value reaches a preset threshold value, wherein
the idle-stop controller executes the idle-stop control before a determination is made by the circuitry, and
the circuitry is configured to interrupt the increasing of the diagnostic value while the engine is stopped by the idle-stop control,
wherein when the engine is stopped by the idle-stop control, the circuitry decreases the diagnostic value by a subtraction amount that increases according to a stopped time; and
an outside air temperature detector configured to detect a parameter correlated with an outside air temperature of the vehicle, wherein
the circuitry increases the subtraction amount according to a drop in the outside air temperature.

3. The oil temperature sensor diagnostic device according to claim 1, wherein the determining of the abnormality of the oil temperature sensor by the processor is further configured to temporarily interrupt the increasing of the diagnostic value while the engine is stopped by the idle-stop control and then update the diagnostic value when the engine is restarted without resetting the diagnostic value according to a stopped time of the engine.

4. The oil temperature sensor diagnostic device according to claim 1, further comprising:
a sensor configured to detect a parameter correlated with a temperature measurement around the vehicle, wherein
the processor increases the subtraction amount according to a decrease in the parameter.

5. The oil temperature sensor diagnostic device according to claim 1, wherein when the engine is stopped by the idle-stop control, the processor stops the increase of the diagnostic value since the engine start, and increases the diagnostic value when the engine is restarted.

6. The oil temperature sensor diagnostic device according to claim 1, further comprising:
a sensor configured to detect a parameter correlated with an ambient temperature measurement around the vehicle, wherein
the processor increases the subtraction amount according to a decrease in the parameter.

7. The oil temperature sensor diagnostic device for the vehicle according to claim 2, wherein
when the engine is stopped by the idle-stop control, the circuitry decreases the diagnostic value by a subtraction amount that increases according to a stopped time.

8. The oil temperature sensor diagnostic device for the vehicle according to claim 2, wherein the determining of the abnormality of the oil temperature sensor by the processor is further configured to temporarily interrupt the increasing of the diagnostic value while the engine is stopped by the idle-stop control and then update the diagnostic value according to a stopped time of the engine when the engine is restarted.

9. The oil temperature sensor diagnostic device according to claim 2, wherein the determining of the abnormality of the oil temperature sensor by the processor is further configured to interrupt the increasing of the diagnostic value while the engine is stopped by the idle-stop control and then update the diagnostic value when the engine is restarted according to the time the engine is stopped.

10. The oil temperature sensor diagnostic device according to claim 2, further comprising:
a sensor configured to detect a parameter correlated with a temperature measurement around the vehicle, wherein
the processor increases the subtraction amount according to a decrease in the parameter.

11. The oil temperature sensor diagnostic device according to claim 2, wherein when the engine is stopped by the idle-stop control, the processor stops the increase of the diagnostic value since the engine start, and increases the diagnostic value when the engine is restarted.

12. The oil temperature sensor diagnostic device according to claim 3, further comprising:
a sensor configured to detect a parameter correlated with an ambient temperature measurement around the vehicle, wherein
the processor increases the subtraction amount according to a decrease in the parameter.

13. An oil temperature sensor diagnostic device mountable on a vehicle and configured to detect an abnormality in an oil temperature sensor, the oil temperature sensor diagnostic device comprising:
a memory storing instructions;
a processor executing the instructions and configured to:
set a diagnostic value that is increased according to an elapsed running time after a cold start of the engine; and
determine an abnormality of the oil temperature sensor when the oil temperature computed on a basis of an output of the oil temperature sensor is less than a preset determination value, and the diagnostic value reaches a preset threshold value, wherein
the idle-stop controller optionally executes the idle-stop control before a determination is made by the processor, and
the processor is configured to interrupt the increasing of the diagnostic value while the engine is stopped by the idle-stop control,
wherein when the engine is stopped by the idle-stop control, the processor decreases the diagnostic value by a subtraction amount that increases according to a stopped time; and
an outside air temperature detector configured to detect a parameter correlated with an outside air temperature of the vehicle, wherein
the processor increases the subtraction amount according to a drop in the outside air temperature.

14. The oil temperature sensor diagnostic device according to claim 13, wherein
when the engine is stopped by the idle-stop control, the processor decreases the diagnostic value by a subtraction amount that increases according to a stopped time.

15. The oil temperature sensor diagnostic device according to claim 13, further comprising:
a sensor configured to detect a parameter correlated with a temperature measurement around the vehicle, wherein
the processor increases the subtraction amount according to a decrease in the parameter.

16. The oil temperature sensor diagnostic device according to claim 13, wherein when the engine is stopped by the idle-stop control, the processor stops the increase of the diagnostic value since the engine start, and increases the diagnostic value when the engine is restarted.

17. The oil temperature sensor diagnostic device according to claim 1, wherein the processor increases the subtraction amount according to a decrease in the parameter.

\* \* \* \* \*